United States Patent [19]

Miyosawa

[11] 4,330,446

[45] May 18, 1982

[54] AQUEOUS DISPERSION FOR METAL COATING FROM COLLOIDAL SILICA, ALKOXY SILANE, AND POLYMER

[75] Inventor: Yoshiaki Miyosawa, Hiratsuka, Japan

[73] Assignee: Kansai Paint Co., Ltd., Japan

[21] Appl. No.: 39,954

[22] Filed: May 17, 1979

Related U.S. Application Data

[63] Continuation of Ser. No. 816,969, Jul. 19, 1977, abandoned.

[30] Foreign Application Priority Data

Jul. 20, 1976 [JP] Japan ................................. 51-86167
Jan. 25, 1977 [JP] Japan ................................. 52-7107
Mar. 31, 1977 [JP] Japan ................................. 52-36545
Apr. 4, 1977 [JP] Japan ................................. 52-38354

[51] Int. Cl.³ ............................ C08K 3/36; C08K 5/54
[52] U.S. Cl. .................................... 523/409; 428/418; 428/447; 525/101; 525/105; 525/288; 525/445; 525/446; 524/533; 524/529; 524/556; 524/558; 523/412; 523/501; 524/555
[58] Field of Search ................. 260/29.2 M, 29.6 NR, 260/29.6 H, 29.7 AT, 22 CQ, 22 S

[56] References Cited

U.S. PATENT DOCUMENTS

| 2,763,573 | 9/1956 | Biefeld | 260/29.2 M |
| 2,857,355 | 10/1958 | Iler | 260/29.2 M |
| 3,023,181 | 2/1962 | TeGrotenhuis | 260/29.2 M |
| 3,169,884 | 2/1965 | Marzocchi et al. | 260/29.2 M |
| 3,228,903 | 1/1966 | Dennis | 260/29.2 M |
| 3,324,074 | 6/1967 | McManimie | 526/29 |
| 3,355,399 | 11/1967 | Cekada | 260/29.2 M |
| 3,476,827 | 11/1967 | Engelhardt | 260/29.2 M |
| 3,556,754 | 1/1971 | Marsden et al. | 260/29.2 M |
| 3,817,894 | 6/1974 | Butler et al. | 260/29.2 M |
| 3,986,997 | 10/1976 | Clark | 260/29.2 M |

OTHER PUBLICATIONS

Kirk–Othmer, Encyclopedia of Chemical Technology, vol. 18, 2nd Ed., Interscience Publishers, New York, (1969), pp. 61–72.
Zimmerman et al., "Handbook of Material Trade Names, Supplement I", 1956, p. 104.

Primary Examiner—John C. Bleutge
Assistant Examiner—A. H. Koeckert
Attorney, Agent, or Firm—Ostrolenk, Faber, Gerb & Soffen

[57] ABSTRACT

A silica complex composition suitable for the surface treatment of metals is disclosed, which comprises a water dispersible silica, an organic polymer soluble or dispersible in water and a di- or trialkoxy (or alkoxyalkoxy) silane compound.

8 Claims, No Drawings

AQUEOUS DISPERSION FOR METAL COATING FROM COLLOIDAL SILICA, ALKOXY SILANE, AND POLYMER

This is a continuation of application Ser. No. 816,969, filed July 19, 1977, now abandoned.

BACKGROUND OF THE INVENTION

This invention relates to a silica-organic polymer complex composition for the surface treatment of metals which essentially comprises silica (silicon dioxide or silicic anhydride) and organic polymer resin. More particularly, the present invention relates to a water dispersible silica-organic polymer complex composition suitable for the treatment of metals, which allows formation of a transparent coating with high hardness, good abrasion resistance and incombustibility, and eliminates the need of water washing after the treatment.

Hitherto, to give metals corrosion resistance as well as a desirable property for painting, surface treatments have widely been made by employing chromates and phospates. However, in recent years the environmental pollution caused by hexavalent chromium compound has given rise to serious social problems. For this reason, the surface treatment process in which chromate is used now necessitates a great amount of plant cost for treating waste washing water and for preventing the scatter of chromate fume. Furthermore, the dissolution of chromic acid from chemical conversion films may constitute a source of environmental pollution.

In the surface treatment process using phosphates, chemical conversion films of zinc phosphate system or iron phosphate system are generally employed. But, also in this process there occurs the problem of environmental pollution by hexavalent chromium compound because it is usually necessary for the phosphate coating film to be subjected to a sealing treatment by a chromate rinsing for the purpose of providing an adequate corrosion resistance. Further, there are other troublesome problems of treating waste water containing the reaction accelerator added to the composition of the phosphate system and metal ions, and of treating a large volume of sludge due to the dissolution of metals. The limited possibility of labour saving at the step of treatment is a further problem involved in this treatment process.

SUMMARY OF THE INVENTION

Accordingly, it is the primary object of this invention to provide a novel surface treatment composition which eliminates the above described problems involved in the conventional surface treatment processes and which allows one to carry out the surface treatment of metals without any environmental pollution.

Other objects and advantages of the present invention will become apparent by reading the following detailed description of the invention and a number of Examples.

The present invention is based upon the finding that a coating film formed on a metal or a phosphate-treated metal by coating and drying a silica-organic polymer complex which is prepared by reacting a water dispersible silica with an organic polymer under a specific condition, exhibits good corrosion resistance and the desirable property for painting equal to or superior to those of the conventional chromate coating film or zinc phosphate coating film followed by an after-treatment by chromic acid.

The above described good corrosion resistance of metals is attainable by using any inorganic-organic complex which contains, as essential component, silica and water soluble or dispersible high molecular compound or organic solvent soluble high molecular compound having therein hydroxyl group(s) such as polyvinyl alcohol, hydroxyethyl cellulose, starch, polyester resin, alkyd resin, epoxy resin and acrylic copolymer. However, it has further been found that the addition of di- or trialkoxy (or alkoxyalkoxy) compound to the complex brings forth a particularly excellent corrosion resistance.

Thus, according to the present invention there is provided a novel composition for the surface treatment of metals which is characterized in that said composition comprises an aqueous dispersion of silica-organic polymer complex consisting of a water dispersible silica, a water soluble or water dispersible organic polymer resin and a di- or trialkoxy (or alkoxyalkoxy) silane compound.

In use, an aqueous solution of the silica-organic polymer complex having a solid content of about 5 to about 40% by weight is coated onto the surface of metal.

The surface treatment composition of the invention is of non-chromate type and needs no washing by water. Also, it can be used by usual coating and drying process without any environmental pollution and provides a saving of labour.

The surface treatment composition of the invention can be prepared by mixing the three components together and reacting the resultant mixture at a temperature above 10° C. and below the boiling point.

The water dispersible silica used in the silica-organic polymer complex (hereinafter referred to simply as "silica complex") is a so-called colloidal silica having the particle size in the range of from 7 to 100 m$\mu$ preferably from 10 m$\mu$ to 50 m$\mu$. When the particle size of the silica is less than 7 m$\mu$, the stability of the particles becomes poor and consequently a stable and homogeneous complex cannot be produced. On the other hand, when the particle size is larger than 100 m$\mu$, the reaction between the silica and organic polymer does not normally proceed sufficiently because the total surface area of the silica particles become too small. Such a colloidal silica is usually supplied to the market in the form of aqueous dispersion and it may be used in the invention as it is.

Colloidal silica of the particle size in the above specified range and in the form of aqueous dispersion may be used with its pH value being either on the acid side or the basic side. Depending upon the pH range where the other component, a water soluble or dispersible organic copolymer resin remains stable, a most suitable colloidal silica is selected. For example, a non-stabilized silica (pH 2–4) commercially available under the trade name "Snowtex-O" or "Snowtex-OL" (supplied by Nissan Chemical Industries, Ltd.) may be employed as a colloidal silica on the acid side. As a colloidal silica on the basic side, there are known silicas (pH 8.4–10) stabilized by the addition of a small amount of alkali metal ion, ammonium ion or amine. Examples of this type of colloidal silica are Snowtex 20, Snowtex C and Snowtex N (trade names of the above mentioned company's products).

Among various organic polymers used in forming the silica complex, acrylic copolymer is one typical example thereof. The acrylic copolymer solution or dispersible in water can be prepared by solution polymerization, emulsion polymerization or suspension polymerization using ordinary unsaturated vinyl monomers. The monomers constituting the acrylic copolymer should contain as essential components vinyl monomers having hydroxyl groups and vinyl monomers having carboxyl groups. The content of each of the two kinds of monomer specified above must be at least 2% and preferably from 3 to 50%. The presence of these functional monomers is essential not only for water solubilization or water dispersibility of the aimed acrylic copolymer but also for acting as reactive groups to the silane compound as will be described later.

Examples of these unsaturated vinyl monomers having such reactive groups in the molecular include: 2-hydroxyethyl acrylate, 2-hydroxyethyl methacrylate, 2-hydroxypropyl acrylate, 2-hydroxypropyl methacrylate, 2-hydroxy-1-methylethyl acrylate, 2-hydroxy-1-methylethyl methacrylate, 2-hydroxy-3-chloropropyl methacrylate, N-methylol acrylic amide, N-methylol methacrylic amide, acrylic acid, methacrylic acid, crotonic acid, itaconic acid and maleic anhydride.

In order to render the necessary hardness, flexibility, and cross linkability to the resin, a suitable amount of copolymerizable unsaturated vinyl or diene monomer may be incorporated into the above described essential monomers. Examples of such a monomer are: ethylene, propylene, butadiene, isoprene, chloroprene, styrene, α-methyl styrene, dimethyl styrene, divinyl toluene, vinyl acetate, vinyl propionate, vinyl ether, vinyl chloride, vinylidene chloride; acrylates such as methyl acrylate, ethyl acrylate, n-butyl acrylate, isobutyl acrylate, 2-ethyl hexyl acrylate and lauryl acrylate; methacrylates such as methyl methacrylate, ethyl methacrylate, n-butyl methacrylate, isobutyl methacrylate, 2-ethyl hexyl methacrylate, lauryl methacrylate, and glycidil methacrylate; acrylic amide, methacrylic amide and acrylonitrile.

These copolymerizable unsaturated vinyl or diene monomers are suitably added to other monomers in accordance with the properties required for the aimed copolymer. The polymerization can be carried out by the conventional synthetic method.

For the same purpose, alkyd resins generally known in the art and obtainable by any conventional synthetic method may also be used. Examples of such an alkyd resin are alkyd resin modified with oil, alkyd resin modified with rosin, alkyd resin modified with phenol resin, styrenated alkyd resin, alkyd resin modified with acryl resin, alkyd resin modified with epoxy resin, alkyd resin modified with silicone resin and oil free alkyd resin (polyester resin). Also, there may be used known epoxy ester resins modified with fatty acids or carboxylic acids. These epoxy ester resins are obtainable by an esterification reaction of carboxyl groups present in the acids with glycidyl groups and secondary hydroxyl groups present in the epoxy resin.

Further, there may be also used known polybutadiene resin such as polybutadiene modified with maleinized drying oil.

For the purpose of this invention, the organic polymer resin should be soluble or dispersible in water. To this end, those resins should be selected which have an acid value in the range of 20–400, preferably 45–150. With the resin having the acid value of less than 20, it becomes difficult to make it water soluble or water dispersible. On the other hand, when the acid value is over 200, the coating film formed thereby will become poor in its drying property and water resisting property and therefore it may be useless for practical use.

To make a complex of the organic polymer resin and the colloidal silica described above, water solubilization or water dispersibilization of the organic polymer resin is absolutely necessary. As an additive useful for this purpose, amine compound can be preferably used. For example, aliphatic amines such as monoethyl amine and diethyl amine, alkanol amines such as di-ethanol amine and tri-ethanol amine, and cyclic amines such as pyridine and piperidine may be exemplified.

The third component of surface treatment composition of the invention is di- or trialkoxy (or alkoxyalkoxy) silane compound which is hereinafter referred to simply as "silane compound." This silane compound functions as a catalyst in forming the complex of silica and organic polymer resin described above. Furthermore, it plays an important role as a cross linking agent for the above mentioned two components as well as for bonding between the substrate metal and the coating film formed thereon. Depending upon whether the aqueous dispersion of colloidal silica is acid or basic, a most suitable silane compound is selected, for example, from the group given below:

Divinyl dimethoxy silane, divinyl di-β-methoxyethoxy silane, di(γ-glycidoxy propyl)dimethoxy silane, vinyl triethoxy silane, vinyl tris-β-methoxyethoxy silane, γ-glycidoxy propyl trimethoxy silane, γ-methacryloxypropyl trimethoxy silane, β-(3,4-epoxycyclohexyl)ethyl trimethoxy silane, N-β-aminoethyl-γ-propylmethyl dimethoxy silane, N-β-aminoethyl-γ-propyl trimethoxy silane, γ-aminopropyl triethoxy silane and the like.

The mixing ratio of the water dispersible silica and the water soluble or water dispersible organic polymer in the composition of the invention is from 5:95 to 95:5 by weight percent as solids. When any further processing has to be made to the coated metal plate, the ratio of from 20:80 to 50:50 is preferably employed. For no further processing being made, the ratio of from 50:50 to 95:5 is preferable.

The amount of silane compound to be added to the complex as the third component of the composition of the invention is generally from 0.5 to 15% based on the total solid weight of water dispersible silica and water soluble or water dispersible polymer resin. The use of 1–10% is preferable. The addition of silane compound under 0.5% cannot bring forth any substantial effect on reaction acceleration and cross linkability. The use of silane compound more than 15% will not particularly increase the effect.

In manufacturing of the silica complex composition of the invention, first the silica and organic polymer resin are mixed together in the form of an aqueous solution or an aqueous dispersion. Then the silane compound is added to the mixture while stirring it thoroughly.

The amount of these three components is so adjusted that the total solid content in the aqueous mixture may be in the range of 10–40% by weight. By doing so, the reaction will be proceeded without any difficulty. The aqueous mixture so adjusted is then aged at ordinary temperature preferably above 10° C. In this manner, the aimed silica complex is formed. In order to produce a tough coating film from the silica complex composition, it is desirable to continuously heat the above mentioned aqueous mixture at a raised temperature between 50° C. and its boiling point (that is usually about 105°–110° C.).

More particularly, a sufficient bond among the three components can be obtained by heating the mixture at the temperature of 50°–90° C.

When the heating of the mixture is continued in the above temperature range, the viscosity of the mixture increases gradually and the viscosity eventually approaches a constant value which is the final point of the reaction to discontinue the heating. This reaction time to the final point is usually in the range of 0.5–5 hours.

The mechanism of chemical reaction caused in the heating of the aqueous dispersion of silica and organic polymer resin has not been clarified yet. When each of the aqueous dispersion of silica and the aqueous solution or aqueous dispersion of organic polymer resin is heated alone, there is not observed any rising up of the viscosity. This is the same as to the binary system of mixture of the silica and the resin and it is impossible to form a transparent coating film by it.

On the contrary, as to the ternary system of mixture including silane compound according to the invention, the viscosity of the system rises up gradually with the continuation of heating as described above. Probably this phenomenon may be attributed to some catalytic action of the silane compound. Thus, it is supposed that by the catalytic action of the silane compound there will occur a dehydration condensation reaction between the silanolic OH-groups present on the surface of silica particles and the alcoholic OH groups of the organic polymer resin and thereby covalent bonds in the form of $\ominus$Si—O—C$\leftarrow$ will be formed. As another possibility, it is also considered that a reaction between the carboxyl groups of the resin and the silanolic OH groups on the silica particles occurs to produce a bond in the form of

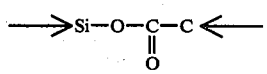

Furthermore, a reaction between the silica and any silanolic OH groups resulting from the hydrolysis of the ester portion of the silane compound itself, and a reaction occurred by the mutual action between the organic polymer resin and the organic groups in the silane compound owing to the cross linking function of the silane compound may be expected as a matter of course.

The formation of bond between silica and organic polymer resin will be proved by the following fact:

Colloidal silica is most unstable in the pH range of 6–8. When silica under this condition of pH is simply mixed with organic polymer, coagulation and gelation occur. But if the mixture is subjected to heating treatment, then it no longer becomes gel after the heat treatment, which is different from that prior to heating.

The silica complex composition of the present invention has features and advantages which result from both of the silica and the organic polymer used in the composition and therefore it is useful for various purposes. Since the composition is manufactured as an aqueous dispersion, it can be used, as it is, to coat the surface of various metal substrates and when used so, it gives a very excellent coating film having good incombustibility, hardness and abrasion resistance derived from the silica and also good flexibility, adhesiveness to the substrate and the like derived from the organic polymer at the same time.

The conventional inorganic noncombustible coating materials prepared by using silicates almost lack flexibility and the conventional organic noncombustible coating materials are only able to produce an opaque coating film due to a high content of the dispersed components.

In contrast with these conventional materials, the silica complex composition of the invention is able to form a non-combustible coating film having excellent transparency and flexibility. Also, it is excellent in corrosion resistance and adhesion to metals.

The composition of the present invention can be used to coat any of the common metal materials. Examples of such material are steel, aluminum, zinc, galvanized steel, tin plated steel and the like as well as steel treated with zinc phosphate, galvanized steel treated with zinc phosphate and the like. For the first mentioned materials of metals, the composition of the invention is used mainly to provide a surface treatment to them. For the latter mentioned metals treated with zinc phosphate, the composition of the invention is used primarily to effect a sealing treatment of the phosphate film. The composition of the invention is also effective as a sealing agent for anodized aluminum materials (Alumite). The treatment of these metal materials with the composition of the invention renders a high corrosion resistance and a good foundation for painting to the treated materials.

The thickness of coating film formed by the composition of the invention can be adjusted according to the use of metal to be treated. Thus, for surface treatment for making desirable property (foundation) for painting, the film thickness is generally adjusted to 0.5–3 microns as dried film thickness. For surface treatment serving also as a primer, the dry film thickness is preferably adjusted to 5–30 microns. The adjustment of film thickness may be made by adjusting the solid content of the silica complex of the invention with water. In use, the solid content is generally in the range of 5–40% by weight. To the composition of the invention, if desired, a suitable amount of rust preventive pigment such as molybdic acid pigment and chromic acid pigment, rust proofing agent such as phenolic carboxylic acid such as tannic acid and gallic acid and/or zirconium compound such as ammonium zirconyl carbonate may be added so as to attain a synergistic corrosion resisting effect.

The surface treatment composition may be applied onto the metal substrate by any conventional coating method such as brushing, spraying, roller coating and immersion coating. Therefore, the surface treatment composition is useful for wide varieties of application including the coatings of coils, moldings and outdoor structures. Furthermore, when the substrate is electrically conductive and the dispersion of the silica complex composition is basic, an electrodeposition coating method may be employed so as to form a coating film of the complex composition uniformly on the surface of the substrate. In this case, the metal substrate is used as an anode because the carboxyl groups in the complex are charged with negative polarity.

After coating, the formed coating film is dried and cured. The conditions necessary for drying and curing may vary depending upon the sort and property of monomers used in the organic polymer according to the invention. For example, air drying or heat drying may be carried out at a temperature between the ordinary temperature and 250° C. for a time from about 5 sec. to about 15 min.

It has not yet become clear why the surface treatment composition of the invention is able to give such an excellent corrosion resistance to metals.

In general, metal and zinc phosphate coating film have a polar surface which is considered to be composed of oxygen, hydroxyl group etc. On the other hand, in the silica complex of the invention, there exist reactive silanol group resulted from the colloidal silica, silanol group resulted from the hydrolysis of the silane compound and further amine compound having corrosion resisting property. Therefore, it is assumed that these reactive groups may be selectively oriented over the metal surface as to form a strong bond with the metal and thereby there may be produced on the surface layer of the metal a coating film having double layers consisting of a first layer mainly composed of silica in the complex and a second dense layer overlaid on the first one and mainly composed of the organic polymer resin.

The silica complex composition of the invention may contain suitable additives as desired. Thus, a cross linking agent such as aminoplast resin, epoxy resin and isocyanate and cationic compound such as titanium, zirconium and molybdenum may be added to the composition to improve the alkali resistance of the coating film. Also, water soluble or water dispersible resin usually used and compatible with the silica complex of the invention may be added to adjust the characteristics of the film as desired. As curing accelerator, there may be also used water dispersible dryer such as cobalt, manganese and lead.

The silica complex composition of the invention has the advantage that its coating film exhibits a complete transparency and a high hardness and is superior in flame resistance.

The composition of the invention is capable of adhering well not only to metals but also to all of materials with a polar surface such as glass, ceramics, concrete, asbestos and wood. It is useful also for the foundation for painting, decorative coating and as flame resistance coating.

On the coating film formed with the surface treatment composition of the invention, there may be overcoated any conventional organic solvent type paint or aqueous paint. The coating according to the invention never adversely affects such a finish coating.

The above and further objects and novel features of the invention as well as the distinguished effects of the invention will be fully understood from a number of the following examples and comparative examples. However, it is to be expressly understood that the examples are for purpose of illustrative only and is not intended as a definition of the limits of the invention.

In the examples, "part" and "percent" are part by weight and percent by weight unless otherwise stated.

EXAMPLE OF PREPARATION OF ACRYLIC COPOLYMER 1 l four neck flask equipped with thermometer, stirrer, condenser and dropping funnel is charged with 180 parts of isopropyl alcohol and after replacement by nitrogen the temperature within the flask is adjusted to about 85° C. Then, a mixture of monomers consisting of 140 parts of ethyl acrylate, 68 parts of methyl methacrylate, 15 parts of styrene, 15 parts of N-n-butoxymethyl acrylamide, 38 parts of 2-hydroxyethyl acrylate and 24 parts of acrylic acid is introduced into the flask together with a catalyst composed of 6 parts of 2,2'-azobis (2,4-dimethyl valeronitrile) by dropping in the course of about two hours. After the completion of dropping, the reaction is continued at the same temperature for a further 5 hours so that a colorless, transparent resin solution with a solid content of about 68% and the acid value of about 67 may be produced at the polymerization rate of approximately 100%. To 500 parts of the resin solution thus formed, there is added 108 parts of dimethylamino ethanol and they are mixed together. After the addition of water, the mixture is thoroughly stirred. In this manner, an aqueous dispersion of acrylic copolymer resin having pH of about 10 is prepared.

MANUFACTURING EXAMPLE 1 OF SILICA COMPLEX COMPOSITION 875 g of the above prepared aqueous dispersion of acrylic copolymer resin (solid content: 20%) are charged into a three neck flask of 1 l volume and then 125 g of an aqueous dispersion of colloidal silica are added by dropping in the course of 10 min. while thoroughly stirring at room temperature (23°–25° C.). The used colloidal silica dispersion is supplied by Nissan Chemical Industries, Ltd. under the trade name of "Snowtex-N" with its $SiO_2$ content being 20%, particle size 10–20 m$\mu$ and pH 9–10.

After the completion of dropping the colloidal silica, 1.5 g of $\gamma$-methacryloxypropyl trimethoxy silane (trade name: "KBM 503" by Shin-etsu Chemical Co.) are added by dropping while stirring and heated up to 85° C. The reaction temperature is maintained at the same temperature for 2 hours to proceed the reaction. Thus, a water dispersible silica complex composition is obtained, which is milky white and viscous (viscosity at 20° C. is 440 cps.).

MANUFACTURING EXAMPLES 2–6

In the same manner as described in Manufacturing Example 1, but using components shown in Table-1, a number of silica complex are obtained.

MANUFACTURING EXAMPLE 7

In place of the aqueous dispersion of acrylic copolymer resin used in Manufacturing Example 1, 375 g of an acrylic emulsion resin commercially available under the trade name of "Almatex XV-Z 2085" by Mitsui Toatsu Chemicals Inc., is used, which is an aqueous dispersion of water dispersible emulsion resin of molecular weight: about 100,000, pH: 2.0 and solid content: 20%. After adjusting pH to 4 by adding 1 g of dimethylamino ethanol to the resin, there are added to and mixed with the resin 125 g of aqueous colloidal silica dispersion (trade name: "Snowtex-O"; particle size: 10–20 m$\mu$, $SiO_2$ content: 20% and pH: 3–4) and 1.5 g of silane compound ("KBM 503"). The mixture is brought to a reaction under the same reacting condition as that in Manufacturing Example 1. In this manner, a white and thixotropic silica complex composition is obtained.

MANUFACTURING EXAMPLE 8

130 parts of water soluble medium oil alkyd resin (trade name: "Arolon 376" by Nisshoku Arrow Chemical Co.; an aqueous dispersion with the solid content of 50%) are charged into a 1 l three neck flask and then 250 parts of water and 4 parts of dimethylamino ethanol are added to it while thoroughly stirring at room temperature (10°–30° C.).

To the mixture, 104 parts of colloidal silica stabilized by amine (trade name: "Snowtex-N" mentioned above)

are added by dropping in the course of 10 min. Further, after the completion of dropping, 2 parts of γ-methacryloxypropyl trimethoxy silane (trade name: "KBM 503" mentioned above) are admixed with it by dropping while stirring and the resultant reaction mixture is then heated up to 85° C. The reaction temperature is maintained at the same temperature for two hours so as to proceed the reaction.

Thus, a milky white and viscous (viscosity at 20° C. is 100 cps.) silica complex composition is obtained, which is water dispersible.

MANUFACTURING EXAMPLES 9–13

According to the procedure described in Manufacturing Example 8 and using the components shown in Table 2, a number of silica complex compositions are obtained.

MANUFACTURING EXAMPLE 14

In place of the alkyd resin used in Manufacturing Example 8, there is used 100 parts of an oil free alkyd resin (common name: polyester resin, trade name: "Arolon 465" by Nisshoku Arrow Chemical Co.) with the solid content of 70%. After adding 200 parts of water to the resin while stirring, 104 parts of acid colloidal silica (trade name: "Snowtex-O" mentioned above) are cautiously added by dropping in the course of 10 minutes while stirring. After the dropping addition, 2 parts of γ-methacryloxypropyl trimethoxy silane (trade name: "KBM 503" mentioned above) are admixed with it by dropping under stirring and the resultant reaction mixture is then heated to 85° C. The reaction temperature is maintained at the same temperature for two hours so as to proceed the reaction.

In this manner, a water dispersible silica complex composition is obtained, which is milky white and viscous (viscosity at 20° C. is 330 cps.)

MANUFACTURING EXAMPLE 15

Into a 1 l three neck flask, 100 parts of epoxyester resin modified with linseed oil and tung oil (trade name: "Residrol VWE 37 L" by Hoechst A. G.; solid content: 65%) are charged and then 250 parts of water and 10 parts of dimethylamino ethanol are added thereto at room temperature (10°–30° C.) while stirring.

To the mixture, 104 parts of colloidal silica stabilized by amine (trade name: "Snowtex-N" mentioned above) are added by dropping in the course of ten minutes. After the completion of dropping the colloidal silica, 2 parts of γ-methacryloxypropyl trimethoxy silane (trade name: "KBM 503" mentioned above) are admixed with it by dropping under stirring and the resultant reaction mixture is heated to 85° C. The reaction temperature is maintained at the same temperature for two hours so as to proceed the reaction.

In this manner, a water dispersible silica complex composition is obtained, which is milky white and viscous (viscosity at 20° C. is 180 cps.).

MANUFACTURING EXAMPLES 16–20

According to the same procedure as that of Manufacturing Example 15 and using the various components shown in Table 3, a number of silica complex compositions are obtained.

MANUFACTURING EXAMPLE 21

In place of the epoxyester resin used in Manufacturing Example 15, there are used 152 parts of epoxyester resin modified by maleinized oil (trade name: "Arolon 507" by Nisshoku Arrow Chemical Co.: solid content: 43%). After adding 200 parts of water to the resin while stirring, 104 parts of acid colloidal silica (trade name: "Snowtex-O" mentioned above) are added thereto by dropping in the course of about 10 minutes.

After the completion of the dropping, 2 parts of γ-methacryloxypropyl trimethoxy silane (trade name: "KBM 503" mentioned above) are admixed with it by dropping under stirring and the resultant reaction mixture is heated up to 85° C. The reaction temperature is maintained at the same temperature for 2 hours so as to proceed the reaction.

In this manner, a water dispersible silica complex composition is obtained, which is milky white and viscous (viscosity at 20° C. is 250 cps.)

EXAMPLE 1

A sheet of steelplated with fused zinc (the amount of zinc plated at one side is 100 g/m$^2$) was subjected to a degreasing treatment by a cathodic, electrolytic degreasing method (5% aqueous solution of sodium carbonate; electrolytic current density: 8 A/dm$^2$ and current flowing time: 10 sec.).

Onto the degreased steel sheet, the silica complex composition prepared in the above described Manufacturing Example 1 was coated as to form a coating film of 2 microns thick as dried. The coating film thus formed was heat-cured by hot air of 100° C. for 30 sec.

The coated steel sheet was then subjected to the known salt spray test to evaluate the corrosion resistance thereof. The result of this test is given in Table 4. As will be seen from the Table, there was observed no growing of white rust on the treated surface of the tested steel sheet even after the elapse of 24 hours.

EXAMPLES 2–21

In the same manner as Example 1, a number of coated steel sheets were prepared using the silica complex compositions of Manufacturing Examples 2–21 described above, and their corrosion resistances were evaluated by the same salt spray test. Table 4 shows the results of the test.

EXAMPLES 22–42

The steel sheets surface-treated with the compositions of the invention as in the above Examples 1–21 were painted with amino alkyd resin enamel (trade name: "Amilac" by Kansai Paint Co., Ltd.) and heated at 150° C. for 15 minutes so as to form a dry coating film of 15 microns thick in total.

These painted sheets were subjected to the salt spray test and it was found that their corrosion resistance was remarkably superior to that of the conventional galvanized steel sheet treated with zinc phosphate. The results of the test are summarized in Table 5.

COMPARATIVE EXAMPLES 1–10

To demonstrate the effect of the present invention by comparison, the following comparative samples were prepared and tested by the salt spray testing method:

| | |
|---|---|
| Comparative sample 1 | non coated galvanized steel sheet. |
| Comparative sample 2 | galvanized steel sheet treated with zinc phosphate. |
| Comparative sample 3 | galvanized steel sheet coated with the mixture of 8 parts of the foregoing acrylic copolymer and 2 parts |

| | |
|---|---|
| | of melamine resin (trade name "Cymel 303" by American Cyanamid Co., USA) as to have a coating film of 2 microns thick as dried. |
| Comparative sample 4 | galvanized steel sheet coated with the mixture of 8 parts of water soluble medium oil alkyd resin (trade name: "Arolon 376" by Nisshoku Chemical Co.) and 2 parts of melamine resin ("Cymel 303" mentioned above) as to have a coating film of 2 microns thick as dried. |
| Comparative sample 5 | galvanized steel sheet coated with water soluble epoxyester resin (trade name: "Residrol VWE 37 L" mentioned above) to have a coating film of 2 microns thick as dried. |
| Comparative samples 6–10 | these samples were prepared by applying a dry coating film 15 microns thick in total of amino alkyd resin enamel (trade name: "Amilac") onto the above described comparative samples 1–5 respectively. |

The results of the salt spray test carried out by using the above listed Comparative samples 1–10 are given in Table 4 and Table 5 as Comparative Examples 1–10.

EXAMPLES 43–48

The silica complex compositions prepared by the above described Manufacturing Examples 1, 5, 8, 12, 15 and 19 were coated onto a sheet of cold rolled steel cleaned by an alkali degreasing treatment respectively. The steel sheet (JIS, G-3141) was 0.5 mm thick and the coating film dried on the steel sheet was 15 microns thick. The coating film was heat-cured by hot air of 200° C. for 2 minutes. The coated samples of the steel sheet were subjected to the salt spray test and it was found that they had excellent corrosion resistance as shown in Table 6.

COMPARATIVE EXAMPLES 11–13

The procedure and the test described in the above Examples 43–48 were repeated except that as coating materials, those used in Comparative Examples 3–5 were employed.

Here, Comparative Examples 11 corresponds to Comparative Example 3, Comparative Example 12 to Comparative Example 4 and Comparative Example 13 to Comparative Example 5.

The results of the test are given in Table 6 for comparison's sake.

EXAMPLES 49–54

According to the procedure described in Examples 43–48, a coating film of 2 microns thick as dried was applied and heated for 30 sec. by hot air of 100° C.

Then, amino alkyd resin paint as described in Example 22 was coated on the coated steel sheet and heated for 15 min. at 150° C. as to form a dry coating film of 17 microns thick in total.

These coated sample sheets were tested to evaluate their corrosion resistance. The results obtained from this test are shown in Table 7.

COMPARATIVE EXAMPLES 14–16

A number of samples of coated steel sheet were prepared according to the procedure described in Example 49 except that the organic polymer resins used in the above Comparative Examples 3–5 were employed in place of the complex compositions for Example 49. Here, Comparative Example 14 corresponds to Comparative Example 3, Comparative Example 15 to Comparative Example 4 and Comparative Example 16 to Comparative Example 5.

The coated samples were tested to evaluate their corrosion resistance. The results obtained are shown in Table 7.

EXAMPLES 55–57

A commercially available steel sheet treated with zinc phosphate (trade name: "Bondelite #3114," manufactured by Nihon Parkerizing Co.) was coated with the silica complex compositions prepared in Manufacturing Examples 1, 8 and 15 respectively. The coated film was heat-cured by hot air of 100° C. for 30 sec. to obtain a dry coating film of 1 micron thick.

The samples of these coated steel sheets were tested by salt spray testing method. The results of the test are given in Table 8. The table shows that the samples have excellent properties almost equal to those of the conventional steel sheet treated with zinc phosphate and further after-treated with chromic acid.

COMPARATIVE EXAMPLES 17–19

The following comparative samples were prepared and tested to evaluate their corrosion resistance:

| | |
|---|---|
| Comparative sample 17 | degreased steel sheet coated with the coating material of Comparative Example 3 to have a dry coating film of 1 micron thick. |
| Comparative sample 18 | commercially available steel sheet treated with zinc phosphate (trade name: "Bondelite #3114") |
| Comparative sample 19 | prepared by subjecting the treated steel sheet of Comparative Example 12 to the conventional chromic acid sealing treatment. |

The results of corrosion test made on these comparative examples are shown in Table 8.

EXAMPLES 58–63

The coated samples were produced in the same manner as described in Examples 43–48 except that aluminum sheets (JIS.$A_1P_3$) were used in place of steel sheet. The corrosion resistance of these coated aluminum sheets was tested by the Cass Test. They exhibited excellent corrosion resistances as shown in Table 9.

EXAMPLES 64–66

The coating manner of Example 58 was repeated except that the aluminum sheet was replaced by aluminum alloy sheet (JIS.$A_2P_1$) and the coated sheets were tested by the Cass Test. They exhibited excellent corrosion resistance as shown in Table 9.

COMPARATIVE EXAMPLES 20–25

For the sake of comparison, the following comparative samples were prepared and tested by Cass Test:

| | |
|---|---|
| Comparative sample 20 | uncoated aluminium sheet (JIS . $A_1P_3$) |
| Comparative sample 21 | uncoated aluminium alloy sheet (JIS . $A_2P_1$). |
| Comparative sample 22–24 | aluminium sheets coated with the organic polymer resin used in Comparative Examples 3–5 up to |

-continued

| | |
|---|---|
| | dry film thickness of 15 microns respectively. |
| Comparative sample 25 | aluminium alloy sheet coated with the same organic polymer resin used in Comparative Example 3. |

These Comparative Examples were tested by Cass Test and the results of the test are given in Table 9 as Comparative Examples 20–25.

EXAMPLES 67–68

From aluminum sheet (JIS.A$_1$P$_3$) and aluminum alloy sheet (JIS.A$_2$P$_1$), two samples of anodized aluminum sheet having a dry film thickness of 3 micron formed by the conventional anodic oxidation using sulfuric acid were prepared. The sample sheets were coated respectively with the silica complex composition of Example 1 as to form a coating film of 1 micron thick as dried.

The coated sheets were heated for 30 sec. at 100° C. and tested by the Cass Test to evaluate their corrosion resistance. The results of the test are given in Table 10.

As seen from the table, they exhibited excellent corrosion resistance compared with that of anodized sheet without sealing (Comparative Example 26).

TABLE 1

| Manufacturing Example | Acrylic copolymer Solid weight g | Colloidal silica (Snowtex-N) Solid weight g | Silane coupling agent (KBM 503) g | Polymerization time hours at 85° C. |
|---|---|---|---|---|
| 2 | 90 | 10 | 1.5 | 2 |
| 3 | 50 | 50 | 1.5 | 2 |
| 4 | 25 | 75 | 1.5 | 2 |
| 5 | 10 | 90 | 5.0 | 1 |
| 6 | 75 | 25 | 9.0 | 0.5 |

TABLE 2

| Manufacturing Example | Alkyd resin Solid weight (part) | Colloidal silica (Snowtex-N) Solid weight (part) | Silane coupling agent (KBM 503) (part) | Polymerization time hours at 85 C. |
|---|---|---|---|---|
| 9 | *1 90 | 10 | 1.5 | 2 |
| 10 | *2 50 | 50 | 1.5 | 2 |
| 11 | *3 25 | 75 | 1.5 | 2 |
| 12 | *4 10 | 90 | 5.0 | 1 |
| 13 | *5 75 | 25 | 9.0 | 0.5 |

*1 trade name "Watersole S-126" manufactured by Dainippon Ink & Chemicals, Inc.
*2 trade name "Arolon 585" manufactured by Nisshoku Arrow Chemical Co.: short oil alkyd resin.
*3 trade name "Arolon 376" manufactured by Nisshoku Arrow Chemical Co.: medium oil alkyd resin
*4 trade name "Residrol VWA 38 L" manufactured by Hoechst A.G.: medium oil alkyd resin
*5 trade name "Phthalkyd W411" manufactured by Hitachi Chemical Co., Ltd.: phthalic alkyd resin

TABLE 3

| Manufacturing Example | Epoxyester resin Solid weight (part) | Colloidal silica (Snowtex-N) Solid weight (part) | Silane coupling agent (KBM 503) (part) | Polymerization time hours at 85° C. |
|---|---|---|---|---|
| 16 | 90 | 10 | 1.5 | 2 |
| 17 | 50 | 50 | 1.5 | 2 |
| 18 | 25 | 75 | 1.5 | 2 |
| 19 | 10 | 90 | 5.0 | 1 |
| 20 | 75 | 25 | 9.0 | 0.5 |

TABLE 4

| | Item | | |
|---|---|---|---|
| Example | Manufacturing Example of silica complex | Salt Spray Test *1 | |
| | | 12 hrs. | 24 hrs. |
| Example 1 | 1 | no change | no change |
| Example 2 | 2 | " | 10% white rust |
| Example 3 | 3 | " | no change |
| Example 4 | 4 | " | 5% white rust |
| Example 5 | 5 | " | no change |
| Example 6 | 6 | " | 10% white rust |
| Example 7 | 7 | " | 10% white rust |
| Example 8 | 8 | " | no change |
| Example 9 | 9 | " | 10% white rust |
| Example 10 | 10 | " | no change |
| Example 11 | 11 | " | 5% white rust |
| Example 12 | 12 | " | no change |
| Example 13 | 13 | " | 10% white rust |
| Example 14 | 14 | " | 10% white rust |
| Example 15 | 15 | " | no change |
| Example 16 | 16 | " | 10% white rust |
| Example 17 | 17 | " | 5% white rust |
| Example 18 | 18 | " | 5% white rust |
| Example 19 | 19 | " | no change |
| Example 20 | 20 | " | 10% white rust |
| Example 21 | 21 | " | 10% white rust |
| Com. Example 1 | — | 100% white rust | 100% white rust |
| Com. Example 2 | — | 80% white rust | " |
| Com. Example 3 | — | " | " |
| Com. Example 4 | — | " | " |
| Com. Example 5 | — | " | " |

*1 According to JIS-Z-2371 Salt spray testing method

TABLE 5

| | Item | | |
|---|---|---|---|
| Example | Manufacturing Example of silica complex | Salt Spray Test*1 | |
| | | 98 hrs. | 192 hrs. |
| Example 22 | 1 | no change/0*2 | no change/2 |
| Example 23 | 2 | " | no change/4 |
| Example 24 | 3 | " | no change/1 |
| Example 25 | 4 | " | no change/1 |
| Example 26 | 5 | " | no change/1 |
| Example 27 | 6 | " | no change/2 |
| Example 28 | 7 | " | no change/2 |
| Example 29 | 8 | " | no change/2 |
| Example 30 | 9 | " | no change/4 |
| Example 31 | 10 | " | no change/1 |
| Example 32 | 11 | " | no change/1 |
| Example 33 | 12 | " | no change/1 |
| Example 34 | 13 | " | no change/4 |
| Example 35 | 14 | " | no change/5 |
| Example 36 | 15 | " | no change/2 |
| Example 37 | 16 | " | no change/6 |
| Example 38 | 17 | " | no change/1 |
| Example 39 | 18 | " | no change/1 |
| Example 40 | 19 | " | no change/1 |
| Example 41 | 20 | " | no change/3 |
| Example 42 | 21 | " | no change/3 |
| Com. Example 6 | — | 100% peeling | — |
| Com. Example 7 | — | 80% peeling/3 | 100% peeling |
| Com. Example 8 | — | 100% peeling | — |
| Com. Example 9 | — | 100% peeling | — |
| Com. Example 10 | — | 100% peeling | — |

*1According to JIS-Z-2371 salt spray testing method
*2Plane part/cross cut part - Plane part and cross cut part were applied with self-adhesive tape and the self-adhesive tape was then peeled off quickly. Value of cross cut part is width (mm) of peeling from cross cut.

TABLE 6

| Example | Manufacturing Example of silica complex | Salt Spray Test*1 24 hrs. | 48 hrs. |
|---|---|---|---|
| Example 43 | 1 | no change/2*2 | 5% red rust/4 |
| Example 44 | 5 | no change/1 | no change/2 |
| Example 45 | 8 | no change/3 | 5% red rust/6 |
| Example 46 | 12 | no change/1 | no change/2 |
| Example 47 | 15 | no change/2 | 5% red rust/4 |
| Example 48 | 19 | no change/1 | no change/2 |
| Comparative Example 11 | — | 100% peeling | — |
| Comparative Example 12 | — | " | — |
| Comparative Example 13 | — | " | — |

TABLE 7

| Example | Manufacturing Example of silica complex | Salt Spray Test *1 24 hrs. | 48 hrs. |
|---|---|---|---|
| Example 49 | 1 | no change/1 | no change/2 |
| Example 50 | 5 | no change/0 | no change/1 |
| Example 51 | 8 | no change/1 | no change/2 |
| Example 52 | 12 | no change/0 | no change/2 |
| Example 53 | 15 | no change/0 | no change/1 |
| Example 54 | 19 | no change/0 | no change/1 |
| Comparative Example 14 | — | 100% peeling | — |
| Comparative Example 15 | — | " | — |
| Comparative Example 16 | — | " | — |

TABLE 8

| Example | Manufacturing Example of silica complex | Salt Spray Test *1 0.5 hr. | 1 hr. | 2 hrs. |
|---|---|---|---|---|
| Example 55 | 1 | no change | no change | no change |
| Example 56 | 8 | " | " | " |
| Example 57 | 15 | " | " | " |
| Comparative Example 17 | — | 30% red rust | 50% red rust | 100% red rust |
| Comparative Example 18 | — | 100% red rust | — | — |
| Comparative Example 19 | — | no change | no change | no change |

TABLE 9

| Example | Manufacturing Example of silica complex | Cass Test *3 4 hrs. | 8 hrs. |
|---|---|---|---|
| Example 58 | 1 | 9 | 8 |
| Example 59 | 5 | 9 | 9 |
| Example 60 | 8 | 9 | 8 |
| Example 61 | 12 | 9 | 9 |
| Example 62 | 15 | 9 | 8 |
| Example 63 | 19 | 9 | 9 |
| Example 64 | 5 | 10 | 9 |
| Example 65 | 12 | 10 | 9 |
| Example 66 | 19 | 10 | 9 |
| Comparative Example 20 | — | 1 | 0 |
| Comparative Example 21 | — | 1 | 0 |
| Comparative Example 22 | — | 5 | 3 |
| Comparative Example 23 | — | 6 | 3 |
| Comparative Example 24 | — | 5 | 3 |
| Comparative Example 25 | — | 5 | 4 |

*3 According to the testing method stipulated in JIS-H-8601.

TABLE 10

| Example | Aluminium material | Cass Test *3 4 hrs. | 8 hrs. |
|---|---|---|---|
| Example 67 | JIS . A$_1$P$_3$ | 10 | 9 |
| Example 68 | JIS . A$_2$P$_1$ | 10 | 9 |
| Comparative Example 26 | JIS . A$_1$P$_3$ | 9 | 7 |

What is claimed is:

1. A composition for surface treatment of metals which comprises an aqueous dispersion of a silica-organic polymer complex which is the reaction product of ingredients consisting essentially of colloidal silica wherein the silica is of 7 to 100 mµ particle size, water soluble or water dispersible organic polymer having both hydroxyl and carboxyl groups and an acid value of 20–200 selected from the group consisting of acrylic copolymer resin, alkyd resin, epoxyester resin and polybutadiene resin, the compounding ratio on a solids basis of said colloidal silica and said organic polymer being in the range of 5:95 to 95:5 by weight, and 0.5–15% by weight based on the solid weight of said colloidal silica and said organic polymer of silane compound selected from the group consisting of divinyl dimethoxy silane, divinyl di-β-methoxyethoxy silane, di(γ-glycidoxy propyl)dimethoxy silane, vinyl triethoxy silane, vinyl tris-β-methoxyethoxy silane, γ-glycidoxy propyl trimethoxy silane, γ-methacryloxypropyl trimethoxy silane, β-(3,4-epoxycyclohexyl)ethyl trimethoxy silane, N-β-aminoethyl-γ-propylmethyl dimethoxy silane, N-β-aminoethyl-γ-propyl trimethoxy silane, and γ-aminopropyl triethoxy silane.

2. A composition as claimed in claim 1, wherein said colloidal silica, said water soluble or water dispersible organic polymer and said silane compound are mixed together in the form of an aqueous solution or aqueous dispersion and reacted with each other at a temperature between 10° C. and 110° C.

3. A composition as claimed in claim 1, wherein said silica has a particle size in the range from 10 to 50 mµ and said organic polymer has an acid value of 45–150.

4. A composition as claimed in claim 1, wherein said silane compound is added in the amount of 1–10%.

5. A composition as claimed in claim 1, wherein said silane compound is γ-methacryloxypropyl trimethoxy silane.

6. A composition as claimed in claim 2, wherein said silica has a particle size of 10–50 mµ, said organic polymer has an acid value of 45–150, the compounding ratio on a solids basis of said silica and said polymer is in the range of 5:95 to 95:5 by weight, said silane is added in an amount of 1–10% by weight based on the solid weight of both said silica and said organic polymer, wherein said mixture has a solid content of 10–40%, and wherein said reaction is continued until the viscosity approaches a constant value.

7. A composition as claimed in claim 6, wherein said compounding ratio is from 20:80 to 50:50.

8. A composition as claimed in claim 6, wherein said compounding ratio is from 50:50 to 95:5.

* * * * *